(No Model.)
H. MITCHELL.
CARVING DEVICE.
No. 345,528. Patented July 13, 1886.
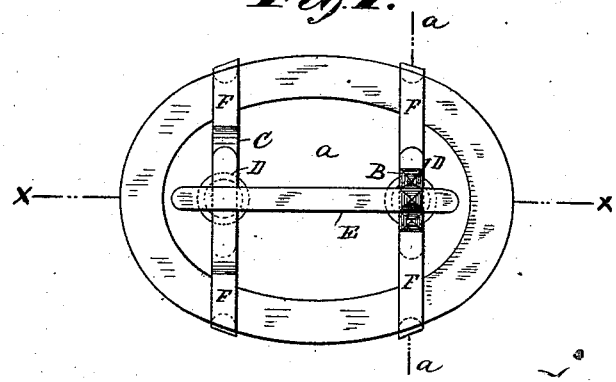
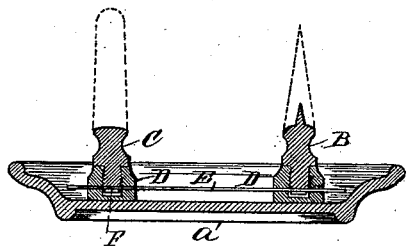 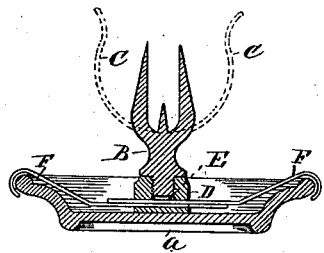
Witnesses:
Gabriel J. W. Gjelsten
H. M. Supple
Inventor
Hiram Mitchell,
By Richards
Attorneys.

UNITED STATES PATENT OFFICE.

HIRAM MITCHELL, OF SCOTTDALE, PENNSYLVANIA.

CARVING DEVICE.

SPECIFICATION forming part of Letters Patent No. 345,528, dated July 13, 1886.

Application filed October 29, 1884. Serial No. 146,872. (No model.)

*To all whom it may concern:*

Be it known that I, HIRAM MITCHELL, a citizen of Pennsylvania, residing at Scottdale, in the county of Westmoreland and State of Pennsylvania, have invented certain new and useful Improvements in Carving Devices, of which the following is a description.

Figure 1 is a plan view of my invention attached to a platter or dish. Fig. 2 is a transverse section on line X X in Fig. 1. Fig. 3 is a transverse section on the line A A in Fig. 1.

Similar letters of reference indicate corresponding parts.

My invention consists of the combination of a three-tined fork at one end and a crotch or U at the other end, both connected together by means of an adjustable rod having four wings or arms extending out over the rim of the platter or dish, the whole being adjustable by means of independent foot-pieces under the fork or crotch, which have threaded dowels screwing into the foot-pieces, and by so doing clamp the whole together rigidly to any sized platter or dish, the parts adjustable to suit any sized fowl.

In the drawings, A is an ordinary platter or dish, and $b$ is a fork with three tines, one short and in the center. This fork is intended to retain the neck of the fowl, the small tine preventing it from slipping.

C is a crotch intended to retain the back or rump of the fowl. The fork $b$ and crotch C have a threaded dowel at the lower end screwing into the foot-pieces D. The foot-pieces D rest on the bottom of the platter. Each foot-piece has two slots passing through it at right angles to each other. The upper slot is to receive the adjustable bar E, and the bottom slot receives the wings or arms F. The bar and arms pass one under the other at the center of the foot-piece and hook over the rim of the platter. It will be seen that by screwing the crotch C and the fork $b$ down they will crowd the adjustable bar E onto the wings F, thus forming an adjustable combination by which the device can be fastened rigidly to any sized platter and be adjusted in length to suit any sized fowl.

The turkeys or other fowls are held rigidly in an elevated position over the platter, for the purpose of allowing the platter under the fowl to be used for the carved meat, thus forming an ornamental piece of table-ware.

Having thus described my invention, I claim—

The combination of the three-tined fork $b$ and the crotch C, each provided with a thread and dowel at its lower end, and the slots at right angles to each other, the adjustable bar E, and the adjustable wings or arms F, having the hooked ends, substantially as described.

HIRAM MITCHELL.

Witnesses:
B. R. MITCHELL,
M. C. MULVIHILL,
J. W. WILEY,
W. H. MITCHELL.